(12) United States Patent
Knebel

(10) Patent No.: US 7,283,297 B2
(45) Date of Patent: Oct. 16, 2007

(54) SCANNING MICROSCOPE HAVING A MIRROR FOR COUPLING-IN A MANIPULATING LIGHT BEAM

(75) Inventor: Werner Knebel, Kronau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/680,980

(22) Filed: Oct. 8, 2003

(65) Prior Publication Data

US 2004/0070804 A1   Apr. 15, 2004

(30) Foreign Application Priority Data

Oct. 10, 2002   (DE) .................................. 102 47 249

(51) Int. Cl.
   *G02B 21/06*   (2006.01)
(52) U.S. Cl. ..................................... 359/388; 250/201.3
(58) Field of Classification Search ................ 359/385, 359/388, 368; 250/201.3
   See application file for complete search history.

(56) References Cited

U.S. PATENT DOCUMENTS

| 5,280,378 | A | * | 1/1994 | Lombardo ................... 359/199 |
| 5,689,333 | A | * | 11/1997 | Batchelder et al. .......... 356/301 |
| 6,159,749 | A | * | 12/2000 | Liu .............................. 436/527 |
| 6,850,363 | B1 | * | 2/2005 | Wendenburg et al. ....... 359/385 |
| 2002/0020800 | A1 | | 2/2002 | Knebel et al. ............ 250/201.3 |
| 2002/0109101 | A1 | * | 8/2002 | Hoffmann ................. 250/458.1 |

FOREIGN PATENT DOCUMENTS

| DE | 19954933 | 5/2001 |
| DE | 10039520 | 2/2002 |

\* cited by examiner

*Primary Examiner*—Stephone B. Allen
*Assistant Examiner*—Lee Fineman
(74) *Attorney, Agent, or Firm*—Darby & Darby

(57) ABSTRACT

A scanning microscope having a light source that emits an illuminating light beam, for illumination of a sample. The illuminating light beam extends along an illumination beam path and can be guided over and/or through the sample using a beam deflection device. A mirror which can be introduced in guided fashion into the illumination beam path directs a manipulating light beam via the beam deflection device onto the sample.

17 Claims, 3 Drawing Sheets

SCANNING MICROSCOPE HAVING A MIRROR FOR COUPLING-IN A MANIPULATING LIGHT BEAM

CROSS REFERENCE TO RELATED APPLICATIONS

This application claims priority to German patent application 102 47 249.1, the subject matter of which is hereby incorporated by reference herein. Furthermore, all references cited herein are hereby incorporated by reference herein.

FIELD OF THE INVENTION

The invention concerns a scanning microscope.

BACKGROUND OF THE INVENTION

In scanning microscopy, a sample is illuminated with a light beam in order to observe the reflected or fluorescent light emitted from the sample. The focus of an illuminating light beam is moved in a specimen plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the detection light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels back through the beam deflection device to the beam splitter, passes through it, and is then focused onto the detection pinhole behind which the detectors are located. Detection light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the path of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.). To make possible acquisition of image data in layers, the sample stage or the objective is shifted after a layer is scanned, and the next layer to be scanned is thus brought into the focal plane of the objective.

German Unexamined Application DE 199 54 933 A1 discloses an arrangement for incoupling at least one beam or an optical tweezers for grasping particles, and/or for incoupling a processing beam, into a microscope beam path, preferably in a laser scanning microscope, means being provided for freely adjustable modification of the location of the beam focus of the optical tweezers and/or the processing beam in terms of modification of the focus position of the microscope. In this arrangement, the focus of the processing beam or optical tweezers is displaceable in the Z direction by displacement of an optical system in the beam path of the processing beam or optical tweezers. Displacement of the focus in the X/Y direction is possible only by displacement of the specimen stage. This is disadvantageous for the user because displacement of the focus is necessarily associated with a change in the image area. In addition, rapid movement of the focus is not possible.

German Application DE 100 39 520 A1 discloses an apparatus and a method for the examination and manipulation of microscopic specimens, having a microscope, a light source serving to illuminate the specimen, an illumination beam path, a detector serving to detect the light returning from the specimen, a detection beam path, a light source serving for specimen manipulation, and a manipulating light beam path. The apparatus and the method according to the invention make possible three-dimensional examination and manipulation of specimens whose extension along the optical axis is greater than the depth-of-field range of the microscope objective being used, specimen manipulation also being said to be possible at all points of the three-dimensional specimen. Three-dimensional detection of the specimen in which a discrimination is performed of specimen light contributions coming from regions that lie beyond the depth-of-field range of the microscope objective is also said to be possible. The apparatus and the method according to the invention are characterized in that the microscope is a confocal scanning microscope. The apparatus contains a beam deflection device for guiding the illuminating light beam and a further one for guiding the manipulating light beam, in which context provision can be made for the beam deflection apparatuses to operate synchronously with one another. The apparatus is therefore very flexible and moreover permits rapid movement of the manipulating light beam. The apparatus is, however, very costly and complex in terms of construction and operation.

SUMMARY OF THE INVENTION

It is an object of the present invention to provide a scanning microscope that, with flexibility and in simple fashion, makes possible manipulation of the sample using a rapidly movable manipulating light beam.

The present invention provides a scanning microscope comprising: a light source that emits an illuminating light beam, for illumination of a sample, that extends along an illumination beam path and can be guided over and/or through the sample using a beam deflection device; a detector that receives detection light, proceeding from the sample, that extends along a detection beam path; a light source that emits a manipulating light beam; and a mirror which can be introduced in guided fashion into the illumination beam path, whereby the mirror directs the manipulating light beam via the beam deflection device onto the sample.

The invention has the advantage of making possible manipulation of the sample in simple fashion without influencing the alignment of the illumination beam path of the scanning microscope. Since the manipulating light beam is guided over or through the sample by the same beam deflection device as the illuminating light beam, the scanning microscope according to the present invention can be manufactured in particularly simple and economical fashion, a further beam deflection device being entirely superfluous.

In a particular embodiment, the mirror is embodied as a hinged mirror. In a neutral position, the mirror does not influence the illumination beam path. In this neutral position, the illuminating light beam goes past the mirror without hindrance. When the mirror is introduced into the illumination beam path, it directs the manipulating light beam to the beam deflection device which guides the illuminating light beam over or through the sample.

As a rule, the hinge-mounted mirror will decay in oscillation for a certain time after a switching operation. A delay equivalent to this time is preferably observed when switching in the manipulating light beam, since the oscillations would be obtrusively perceptible as changes in location on the sample. The mirror is preferably mounted in vibration-free fashion so that as it is introduced (hinged out), no obtrusive oscillations and vibrations are generated and transferred in troublesome fashion to the scanning microscope.

A preferred embodiment provides that the mirror introduced into the illumination beam path automatically interrupts the illuminating light beam in that position. A great advantage of this embodiment is that during manipulation of the sample—i.e. if light at a high power level (e.g. 488 nm, 200 mW) is inputted into the beam paths of the scanning microscope by way of the manipulating light beam—the detectors, which e.g. can be sensitive photomultipliers, are covered by the mirror and consequently protected, since they cannot be impinged upon or dazzled by residual light of the manipulating light beam, which would result e.g. in a long photomultiplier dead time and thereby prevent rapid measurement. In this embodiment, the mirror for the illuminating light beam is opaque and can preferably have a metal coating.

In another embodiment, the mirror for the illuminating light beam is at least partially transparent. In this embodiment, the illuminating light beam and the manipulating light beam can be guided together over and/or through the sample, the mirror being adjustable in such a way that the manipulating light beam precedes the illuminating light beam on a scanning track. A recovery measurement can thus be performed after preliminary bleaching. In this embodiment the mirror is preferably embodied as a dielectric mirror that is largely transparent to the illuminating mirror while it is preferably highly reflective in terms of the manipulating light beam. The mirror can also, for example, be embodied as a semitransparent metal mirror. In this embodiment a compensation element is introduced, together with the hinged mirror, into the illumination beam path in order to compensate for a parallel beam offset of the illuminating light beam.

The illuminating light beam preferably can be guided on a scanning track over and/or through the sample, the scanning track preferably being largely meander-shaped or sinusoidal. Especially in the embodiment in which the mirror is at least partially transparent to the illuminating light beam, the manipulating light beam preferably can be guided, together with the illuminating light beam, on the same or a parallel scanning track.

In another preferred embodiment, the hinged mirror comprises a polarizing beam splitter. In this embodiment the manipulating light beam is, for example, perpendicularly polarized and is reflected at the beam splitter, while the illuminating light beam has the same wavelength but is polarized in the parallel direction and therefore is transmitted by the beam splitter almost without loss. The beam splitter is also highly transmissive for fluorescent light. When a beam splitter cube is selected, the additional compensation element for compensating for parallel offset is omitted.

In the embodiment in which the mirror interrupts the illuminating light beam, the beam deflection device can guide the manipulating beam over the sample on any arbitrary scanning track, e.g. one defined by the user, that differs from the scanning track of the illuminating light beam.

In a preferred embodiment, the mirror is motor-driven, the motorized drive system preferably containing an actuating motor or a galvanometer. A galvanometer has the advantage that it makes possible rapid introduction and rapid withdrawal of the mirror, so that the manipulating light beam can be switched in and out even on a cycle of fractions of a second.

In an embodiment, the manipulating light beam at least partially bleaches the sample. In another embodiment, the manipulating light beam cuts the sample; this could, for example, encompass separating out a cell nucleus. In another embodiment, the manipulating light beam acts as an optical tweezers. Influencing of the sample by multi-photon excitation or by irradiation with UV light is also conceivable.

The scanning microscope is preferably a confocal scanning microscope. The latter can be embodied, for example, in point-scanning fashion, the sample being scannable one grid point at a time. The scanning microscope can also be embodied in line-scanning fashion, such that entire lines can be illuminated all at once, for example using a fanned-out illuminating light beam, and scanned as a whole.

In a preferred embodiment, means are provided for switching on and off or attenuating the manipulating light beam and/or the illuminating light beam. These means are preferably embodied as acoustooptical components, for example acoustooptical modulators or acoustooptical filters. A zoom optical system, with which a modification of the focusing of the manipulating light can be effected, is preferably provided in the manipulation beam path.

BRIEF DESCRIPTION OF THE DRAWINGS

The subject matter of the invention is depicted schematically in the drawings and will be described below with reference to the Figures, identically functioning components being labeled with the same reference characters. In the drawings.

DETAILED DESCRIPTION OF THE INVENTION

Figure 1:
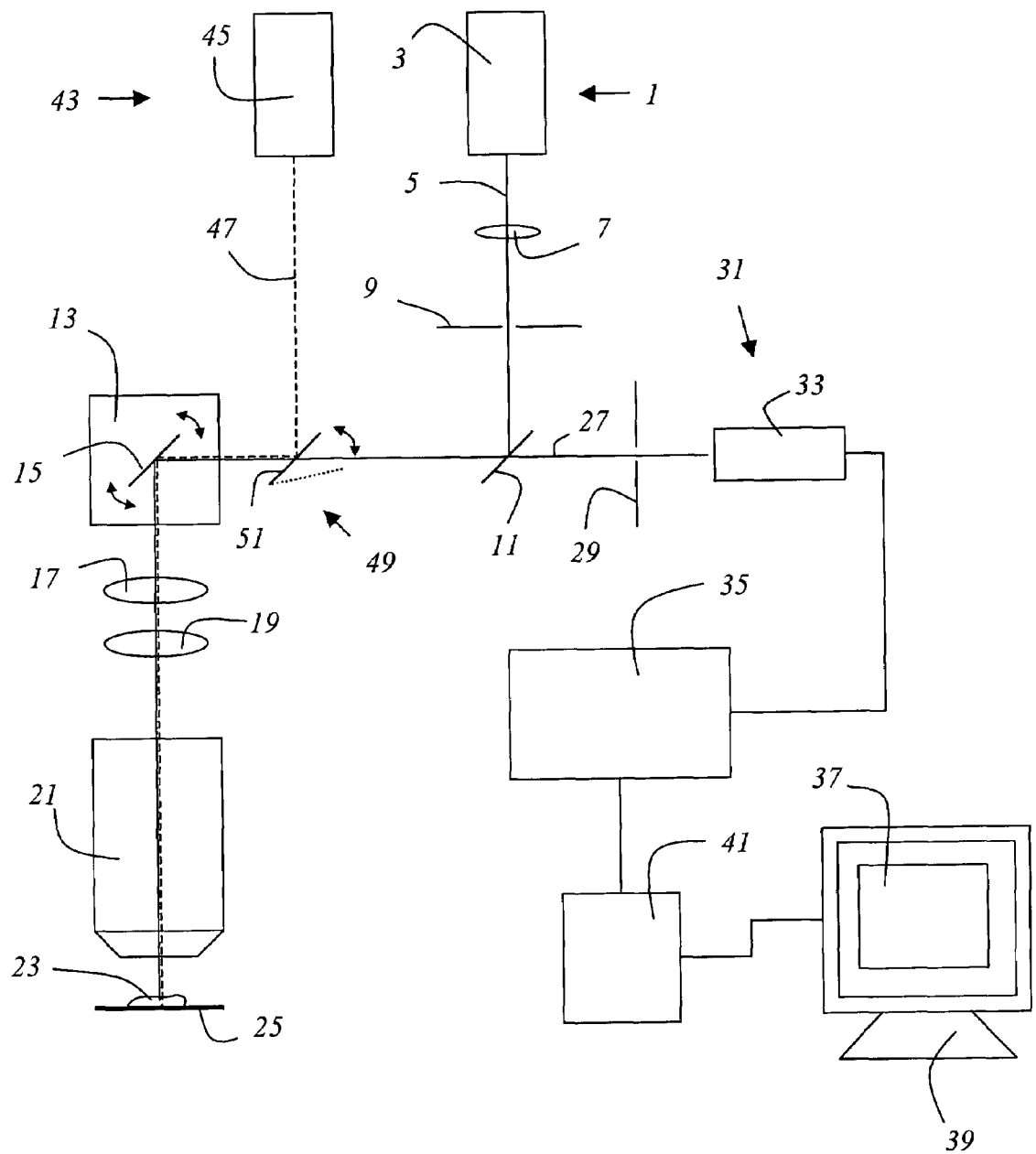
FIG. 1 shows a scanning microscope according to the present invention.

FIG. 1 schematically shows a confocal scanning microscope according to the present invention. The scanning microscope contains a light source 1 that is embodied as laser 3. Illuminating light beam 5 emitted from laser 3 is focused by optical system 7 onto an excitation pinhole 9 and, after passing through excitation pinhole 9, is reflected by a main beam splitter 11 to a beam deflection device 13 which contains a gimbal-mounted scanning mirror 15, and is guided by beam deflection device 13, through a scanning optical system 17, a tube optical system 19 and an objective 21, over or through sample 23. Sample 23 is positioned on a specimen stage 25 that, driven by a motor, is axially displaceable with respect to the optical axis of the illumination beam path. Detection light 27 proceeding from sample 23 travels back on the same light path through objective 21, tube optical system 19, scanning optical system 17, and beam deflection device 13 to main beam splitter 11, passes through the latter, and after passing through detection pinhole 29 strikes detector 31, which is embodied as photomultiplier 33. Detector 31 generates electrical detected signals that are further processed in a processing unit 35, for example so that a displayable image 37 of the scanned region of sample 23 can be displayed to the user on monitor 39 of a PC 41.

A further light source 43, which is embodied as a pulsed laser 45, generates a manipulating light beam 47 that strikes a mirror 49 which is embodied as hinged mirror 51. In the position drawn with a dotted line, mirror 49 allows illuminating light beam 5 to pass unhindered, and directs manipulating light beam 47 onto a beam trap (not shown in this Figure). In the position (depicted in the Figure as a solid line) in which hinged mirror 51 is introduced into the illumination beam path, mirror 49 directs manipulating light beam 47 to beam deflection device 13, which guides it over or through sample 23. Hinged mirror 51 is embodied as a dielectrically coated mirror which allows illuminating light beam 5 to pass substantially unhindered, so that it travels together with manipulating light beam 47 to sample 23.

Figure 2:
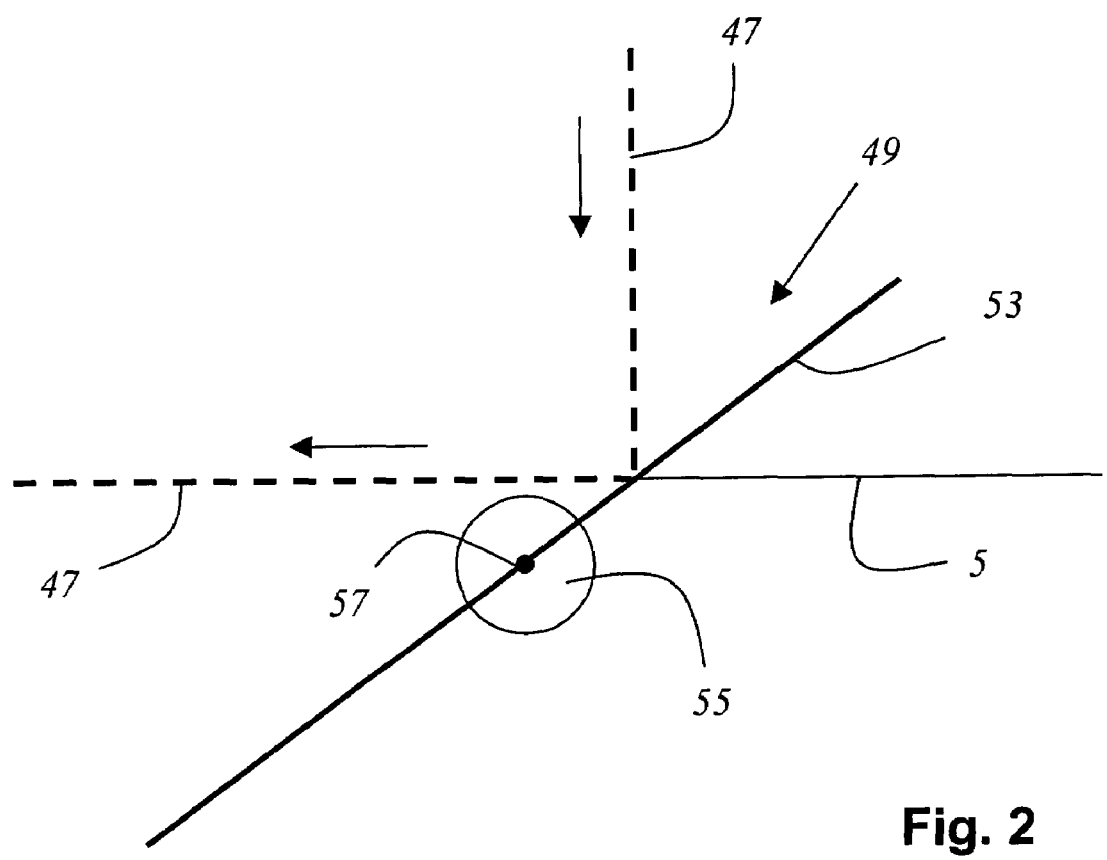
FIG. 2 shows a detail of the scanning microscope according to the present invention.

FIG. 2 shows a detail of the incoupling of manipulating light beam 47 using a mirror 49 which is embodied as metal mirror 53 and is rotatable, using a galvanometer 55, about a rotation axis 57. In the position depicted in FIG. 2, metal mirror 53 is introduced into the illuminating light beam path and directs manipulating light beam 47 to the beam deflection device, whereas it completely blocks illuminating light beam 5.

Figure 3:
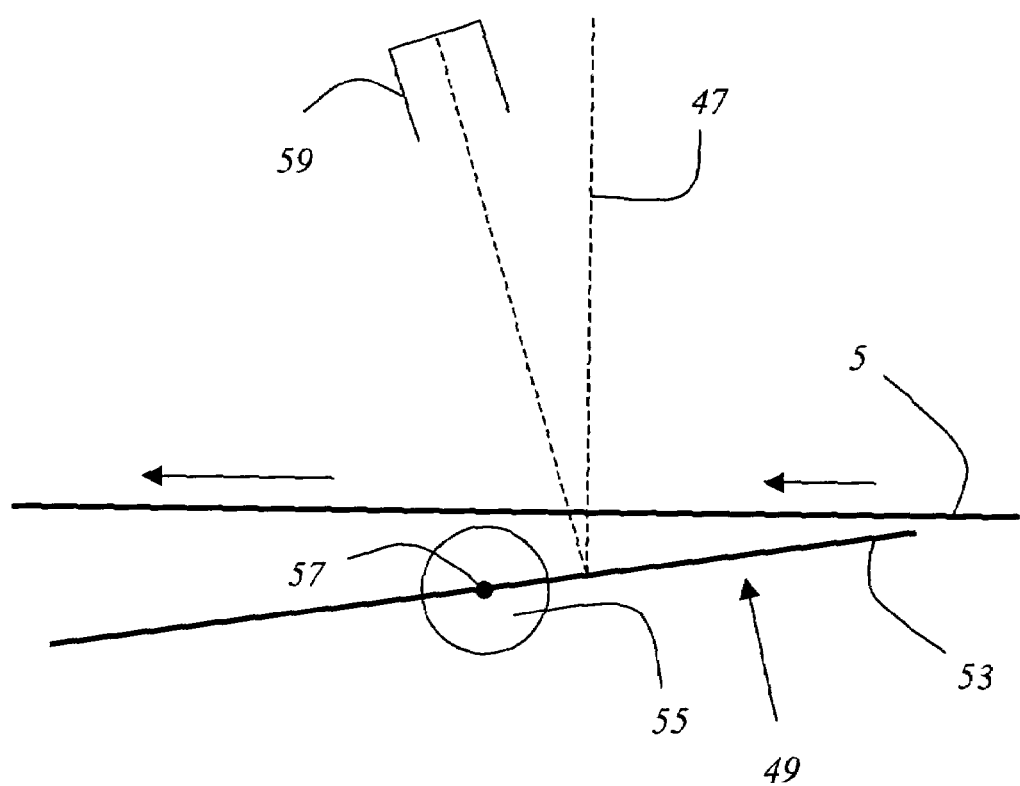
FIG. 3 shows a further detail of the scanning microscope according to the present invention.

FIG. 3 shows the components already explained in FIG. 2; in the position shown here, metal mirror 53 allows illuminating light beam 5 to pass unhindered and directs manipulating light beam 47 into a beam trap 59.

The invention has been described with reference to a particular exemplary embodiment. It is self-evident, however, that changes and modifications can be made without thereby leaving the range of protection of the claims below.

What is claimed is:

1. A scanning microscope comprising:
    a light source that emits an illuminating light beam, for illumination of a sample, that extends along an illumination beam path and can be guided over the sample using a beam deflection device;
    a detector that receives detection light, proceeding from the sample, that extends along a detection beam path;
    a light source that emits a manipulating light beam; and
    a mirror which can be selectively introduced in guided fashion into the illumination and detection beam paths at a position in the illumination and detection beam paths, the detection beam path having a direction opposite to a direction of the illumination beam path at the position, whereby the mirror directs the manipulating light beam via the beam deflection device onto the sample, and wherein the manipulating light beam can be guided over the sample using the beam deflection device.

2. The scanning microscope as defined in claim 1, wherein the mirror is a hinged mirror.

3. The scanning microscope as defined in claim 1, wherein the mirror is motor-driven.

4. The scanning microscope as defined in claim 3, wherein the mirror is motor-driven using a galvanometer.

5. The scanning microscope as defined in claim 1, wherein the illuminating light beam can be interrupted by the minor.

6. The scanning microscope as defined in claim 1, wherein the mirror has a metal coating.

7. The scanning microscope as defined in claim 1, wherein the illuminating light beam can be guided on a scanning track aver and/or through the sample.

8. The scanning microscope as defined in claim 7, wherein the manipulating light beam can be guided on the scanning track over and/or through the sample.

9. The scanning microscope as defined in claim 8, wherein the manipulating light beam precedes the illuminating light beam on the scanning track.

10. The scanning microscope as defined in claim 8, wherein the scanning track is largely meander-shaped or sinusoidal.

11. The scanning microscope as defined in claim 1, wherein the manipulating light beam at least partially bleaches the sample.

12. The scanning microscope as defined in claim 1, wherein the manipulating light beam cuts the sample.

13. The scanning microscope as defined in claim 1, wherein the manipulating light beam acts as an optical tweezers.

14. The scanning microscope as defined in claim 1, wherein the scanning microscope is a confocal scanning microscope.

15. A scanning microscope comprising:
    a light source that emits an illuminating light beam, for illumination of a sample that extends along an illumination beam path and can be guided over the sample using a beam deflection device:
    a detector that receives detection light, proceeding from the sample, that extends along a detention beam path;
    a light source that emits a manipulating light beam; and
    a mirror which can be introduced in guided fashion into the illumination and detection beam paths at a position in the illumination and detection beam paths, the detection beam path having a direction opposite to a direction of the illumination beam path at the position,
    whereby the mirror directs the manipulating light beam via the beam deflection device onto the sample,
    wherein the manipulating light beam can be guided over the sample using the beam deflection device, and
    wherein the mirror is at least partially transparent to the illuminating light beam.

16. The scanning microscope as defined in claim 15, wherein the illuminating light beam and the manipulating light beam can be guided together over and/or through the sample.

17. A scanning microscope comprising:
    a light source that emits an illuminating light beam for illumination of a sample, that extends along an illumination beam path and can be guided over the sample using a beam deflection device;
    a detector Chat receives detection light, proceeding from the sample, that extends along a detection bean path;
    a Light source that emits a manipulating light beam: and
    a mirror which can be introduced in guided fashion into the illumination and detection beam paths at a position in the illumination and detection beam paths, the detection beam path having a direction opposite to a direction of the illumination beam path at the position,
    whereby the mirror directs the manipulating light beam via the beam deflection device onto sample,
    wherein the manipulating light beam can be guided aver the sample using the beam deflection device, and
    wherein the mirror can be put in a neutral position out of The illumination beam path.

* * * * *